United States Patent [19]
Bavin

[11] 3,767,053
[45] Oct. 23, 1973

[54] SWIVEL FILTER
[75] Inventor: Lowell R. Bavin, West Unity, Ohio
[73] Assignee: The Aro Corporation, Bryan, Ohio
[22] Filed: Aug. 18, 1971
[21] Appl. No.: 172,641

[52] U.S. Cl. .............................. 210/232, 210/454
[51] Int. Cl. ............................................. B01d 27/08
[58] Field of Search ..................... 210/91, 232–240, 210/249, 430, 431, 432, 436, 454; 137/625.22, 625.29

[56] References Cited
UNITED STATES PATENTS
| | | | |
|---|---|---|---|
| 3,384,242 | 5/1968 | Kudlaty et al. ..................... | 210/436 |
| 2,751,930 | 6/1956 | Redner ............................... | 210/429 |
| 3,485,371 | 12/1969 | Costantini ........................... | 210/234 X |
| 3,526,251 | 9/1970 | Rosaen ............................... | 210/234 X |
| 3,645,401 | 2/1972 | Roberts ............................... | 210/232 |

OTHER PUBLICATIONS
Auslegeschrift 1,065,683, Oct. 7, 1953, Maciejewski.

Primary Examiner—Samih N. Zaharna
Assistant Examiner—T. A. Granger
Attorney—Molinare, Allegretti, Newitt & Witcoff

[57] ABSTRACT

An improved filter construction for a pneumatically operated device includes a cylindrical body with a central bore and an inlet passage to the bore. The inlet passage is transverse to the longitudinal axis of the central bore. Within the central bore is a threadably positioned hollow casing and a cap. A filter element is positioned by the casing and cap in a fluid flow path through the hollow casing. The cap and casing are keyed together and are also adapted to rotate together into a first fluid flow and filter position or into a second fluid disconnect and filter element replacement position. When located in the second position, the casing blocks the fluid path and the cap is removable. Upon removal of the cap, the filter may be removed and replaced.

10 Claims, 5 Drawing Figures

FIG. I

INVENTOR:
LOWELL R. BAVIN

INVENTOR:
LOWELL R. BAVIN
BY
Molinare, Allegretti, Newitt & Witcoff
ATT'YS

INVENTOR:
LOWELL R. BAVIN

INVENTOR:
LOWELL R. BAVIN
BY
Molinare, Allegretti, Newitt, Witcoff
ATT'YS

SWIVEL FILTER

BACKGROUND OF THE INVENTION

This invention relates to an improved filter construction and in particular to a filter construction which may be utilized with a pneumatically operated device.

During the operation of a pneumatic device, air is supplied to the air motor associated with the device, thereby providing a source of energy to do work. The air that is supplied may contain rust, pipe scale, dirt or other contaminants which could damage the internal working parts of the motor. Thus, it is desirable to filter the air prior to its utilization for operation of the motor.

Filter mechanisms of various construction have in the past been utilized with numerous types of fluid driven devices. Certain characteristics are desirable for such filter mechanisms. A desirable characteristic is that the filter element of the mechanism should be easily removed and replaced by a new, clean filter element. Additionally, the filter element should be replaceable without disconnecting the fluid flow pressure source from the fluid operated device. Also, the filter mechanism should not limit the motion and freedom of operation of the fluid operated device.

SUMMARY OF THE INVENTION

In a principal aspect, the present invention of an improved filter construction includes a filter body with a central bore. An inlet is provided through the body to the central bore. Positioned within the central bore is a hollow filter casing and a filter cap. Fluid flows from the inlet into the casing and thence out an outlet to an air motor or the like. Positioned between the cap and casing within the fluid flow passage in the casing is a fluid flow filter element. The filter element, casing and cap may be positioned in a first fluid flow position or a second fluid flow disconnect position. The casing blocks the flow of fluid through the filter when in the second position. When in the second position, the filter element and the cap are removable from the filter construction so that a new filter element may be substituted in the filter construction.

It is thus an object of the present invention to provide an improved filter construction for utilization with fluid operated apparatus.

It is a further object of the present invention to provide a filter construction in which the filter can be replaced without disconnecting the fluid flow source from the filter construction.

Still another object of the present invention is to provide a filter construction which does not inhibit or limit the mobility of the apparatus with which the filter construction is associated.

One further object of the present invention is to provide a filter construction wherein the filter element is easily removable and replaceable.

These and other objects, advantages and features of the present invention will be set forth in greater detail in the description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
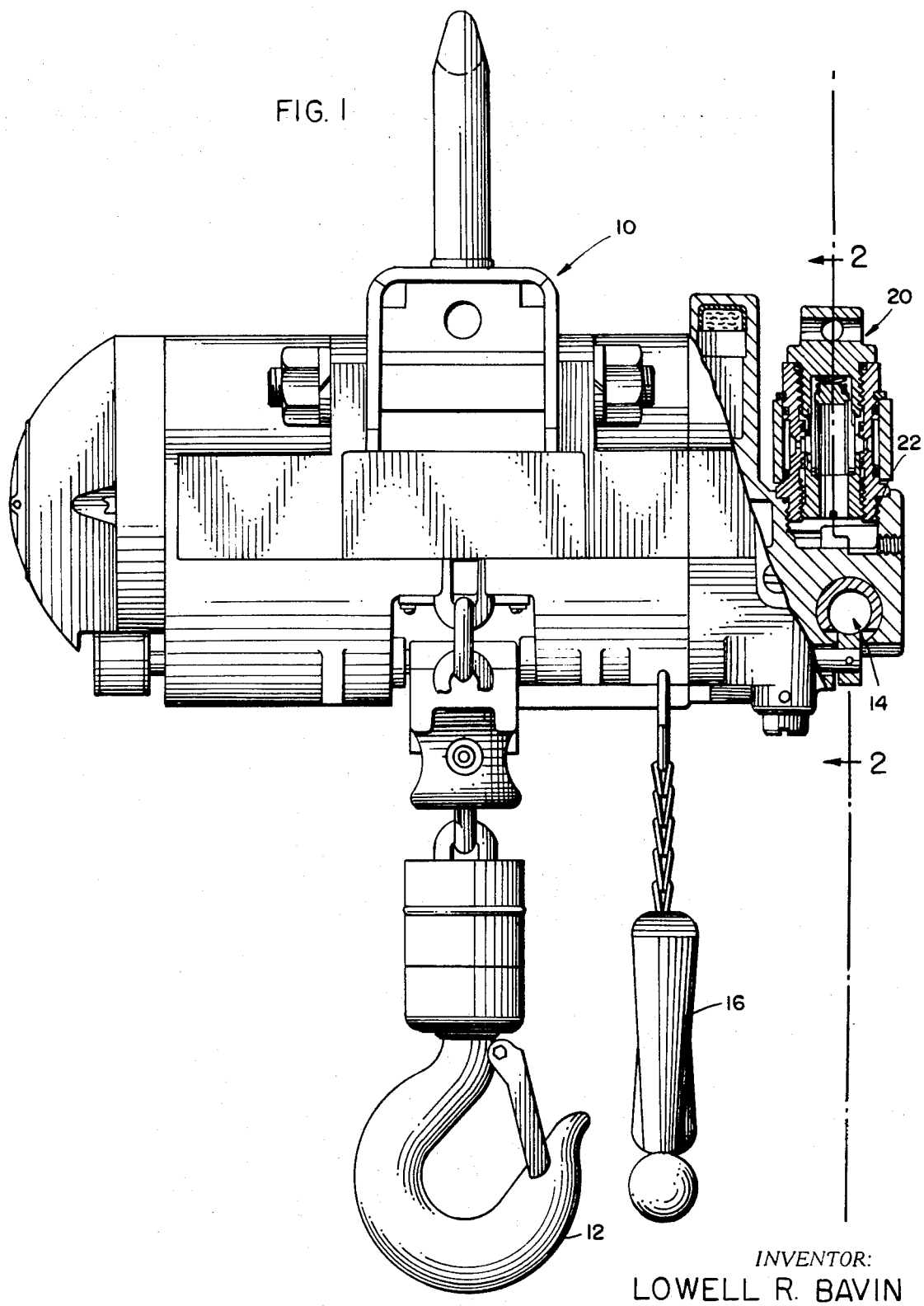
FIG. 1 is a cut-away front elevation view of a pneumatically-driven air hoist which includes the filter construction of the present invention associated therewith.
Figure 2:
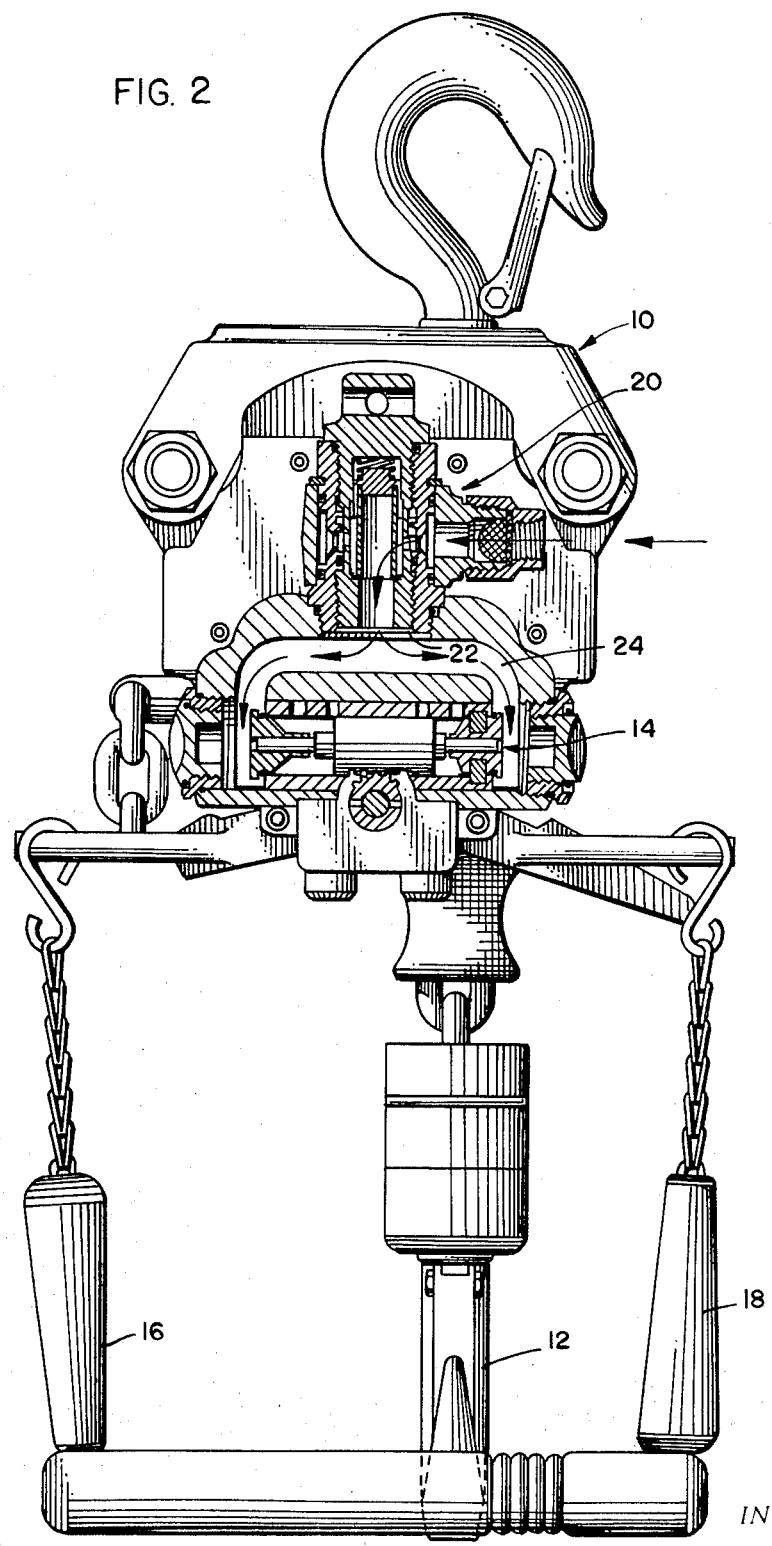
FIG. 2 is a side, cross-sectional view of the filter construction and associated air hoist taken substantially along the line 2—2 of FIG. 1.

Referring first to FIGS. 1 and 2, the filter construction of the present invention may be used in association with any pneumatically operated apparatus. In the description of the preferred embodiment which follows, for purposes of illustration, the filter construction is utilized with an air hoist 10 of the type which includes a lift hook 12. The hook 12 is movable in response to operation of an air motor within the air hoist 10. The direction of motion of the hook 12 is controlled by operation of a valve assembly 14, assembly 14 being responsive to movement of manually operated handles 16 and 18. That is, if the handle 16, illustrated in FIG. 2, is pulled downward, the valve assembly 14 admits air through selected passages to an air motor within the air hoist 10. The motor then operates in a first direction causing the hook 12 to rise, for example. By the same token if the handle 18 is pulled, the valve assembly 14 is affected in the opposite sense, thereby operating the air motor in the opposite sense to lower the hook 12, for example.

The possible directions of air flow to the valve assembly 14 are depicted in FIG. 2. As illustrated, air flows in through a filter construction 20 through an outlet 22 of the filter construction 20 and into the air channel 24. Thus, while the filter construction 20 of the present invention is illustrated in combination with an air hoist, it is entirely possible and likely that the filter construction can be utilized with any air driven or fluid driven apparatus. The principles of operation of the fluid driven apparatus do not affect the operation of the filter construction of the present invention.

Figure 3:
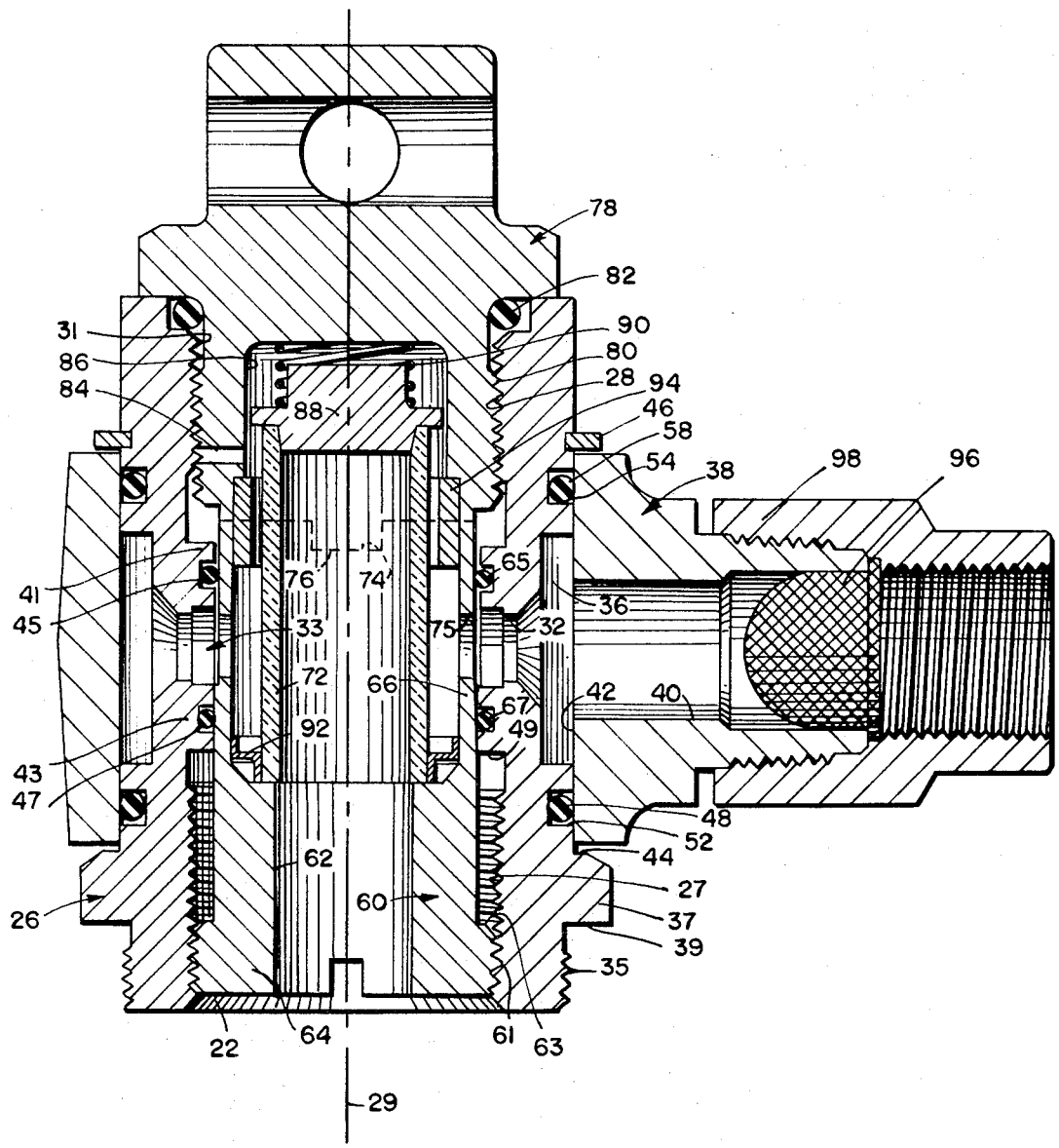
FIG. 3 is an enlarged elevational cross-sectional view of the filter construction of the invention wherein the filter element is positioned for fluid flow therethrough.
Figure 4A:
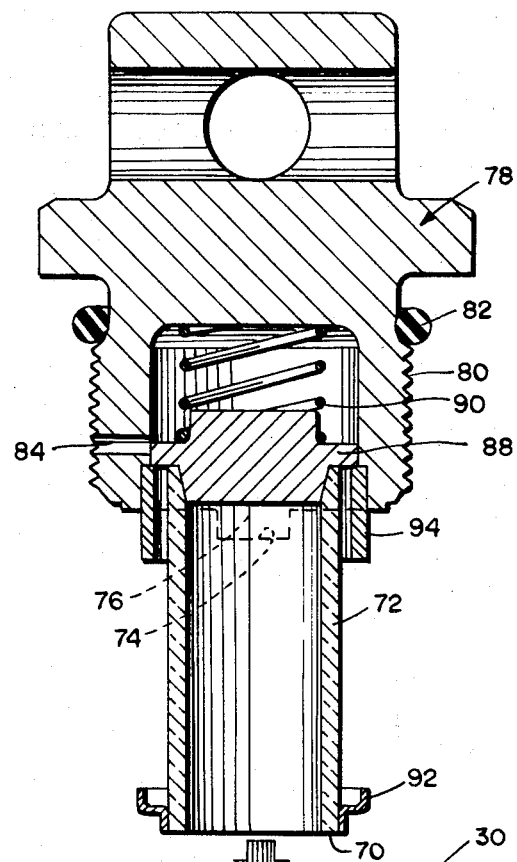
FIGS. 4A and 4B are cross-sectional views of the filter construction of the type shown in FIG. 3 wherein the filter element has been removed as illustrated in FIG. 4A and the main body of the filter construction is shown positioned to block fluid flow as illustrated in FIG. 4B.
Figure 4B:
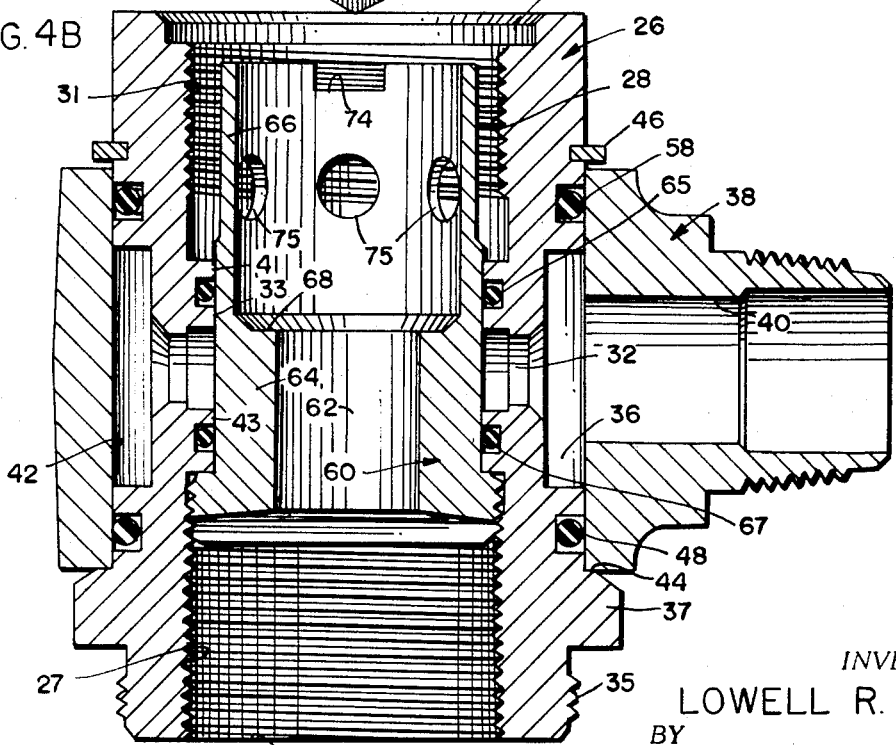

The remaining portion of the description will therefore be directed primarily to FIGS. 3, 4A, and 4B which show, in an enlarged view, the filter construction 20 illustrated in FIGS. 1 and 2. Thus, in FIGS. 3, 4A and 4B like numbers refer to like parts of the apparatus.

The filter construction 20 includes a main cylindrically shaped body 26. The body 26 includes a central bore 28 having a longitudinal axis 29. The bore 28 includes an outlet opening 22 and a cap assembly opening 30. Threads 27 and 31 are defined on the interior of bore 28 adjacent said openings 22 and 30, respectively.

A plurality of passages as at 32 extend through the body 26 and connect with the bore 28. In the embodiment disclosed, the passages 32 are positioned at 90° intervals about the circumference of the body 26. Of course, any number of passages and any angular arrangement may be chosen. A circumferential channel 36 girds the outside surface of the body 26 and interconnects the passages 32.

External threads 35 on the outlet end of the body 26 facilitate attachment of the filter construction 20 to the air hoist. A circumferential ridge 37 of body 26 includes an upper flange surface 44 and a lower flange surface 39. Surface 39 limits the extent which the filter construction 20 may be threaded into the air hoist.

The threads 27 and 31 in bore 28 have identical pitch and diameter. Threads 27 and 31 are separated by a non-threaded central section 33 of the bore 28. Central section 33 includes an upper internal, sealing flange 41 and a lower internal, sealing flange 43. Both sealing flanges 41 and 43 lie in planes which are perpendicular to the axis 29. Flanges 41 and 43 are positioned on opposite sides of the passages 32 and have equal diameters. Flange 41 includes a circumferential groove 45 with an O-ring seal 65 and flange 43 similarly includes a groove 47 with a seal 67. Importantly, flange 43 includes a lower seating surface 49 which will be discussed in greater detail below.

An air inlet swivel member 38 is positioned on body 26 and includes an inlet passage 40 and a bore 42 for body 26. The passage 40 and bore 42 in the disclosed embodiment are substantially perpendicular to each other, although this is not to be construed as a limited feature of the invention. The diameter of bore 42 is substantially equal to the external diameter of the body 26. Thus, the swivel member 38 is fitted onto the body 26 so that the passage 40 coincides with the channel 36. The flange surface 44 on the body 26 in cooperation with a retaining ring 46 prevents translation of the swivel member 38 in a direction parallel to the axis 29 of bore 28. Seals 48 and 58 positioned in circumferential grooves 52 and 54 respectively of body 26 seal the swivel member 38 with the body 26. Consequently, swivel member 38 may be freely rotated about body 26 (i.e. axis 29) while a fluid flow passage is maintained to bore 28 from passage 40. Swivel member 38 also includes a strainer 96 held in position by a retaining cap 98 as shown in FIG. 3.

Positioned for cooperation with threads 27 is an externally threaded casing member 60. The casing member 60 includes a central passage 62. The central passage 62 is concentric with the bore 28. The casing member 60 also includes a lower outlet section 64 and an upper filter section 66. The internal diameter of passage 62 in the filter section 66 is greater than the internal diameter of the outlet section 64. A surface 68 is defined by the juncture of filter section 66 and the outlet section 64. Surface 68 cooperates with the lower end surface 70 of a filter 72 in the manner illustrated in FIG. 3.

The filter section 66 of the casing member 60 includes a plurality of passages 75 lying in a plane transverse to the axis 29. The passages 75 are co-planar with the passages 32 in the body 26 when the casing member 60 is in what is defined as a first or fluid flow position. This position is illustrated in FIG. 3. The filter section 66 at its upper end surface includes a keyed section 74 which is cooperative with a matching keyed section 76 of a cap 78.

The outlet section 64 is externally threaded. The external threads terminate at a flange surface 63. The surface 63 engages surface 49 to limit the upward travel of casing 60. Importantly, the unthreaded external diameter of the outlet section 64 is substantially equal to the internal diameter of sealing sections 41 and 43. Also, the unthreaded portion of outlet section 64 extends in a direction parallel to the axis 29 for a distance at least equal to the distance of separation of sections 41 and 43 along axis 29. This relationship is necessary to permit sealing of the fluid flow passage through the filter construction 20 when the casing 60 is in the position shown in FIG. 4B.

The cap 78 also includes external threads 80 cooperable with threads 31 of body 26. Thus, when the keyed sections 76 and 74 are engaged with each other and the threads 80 are engaged with the threads 31 and threads 61 are engaged with threads 27 as illustrated in FIG. 3, the cap 78 and casing member 60 can be rotated in unison about the longitudinal axis 29 of the bore 28.

An O-ring seal 82 is provided to seal the cap 78 against the body when the cap 78 is in the first position as illustrated in FIG. 3. The cap 78 includes a bleed channel 84, which is discussed in more detail below.

Positioned in a cavity or hollow 86 in the bottom side of cap 78 is a biased plug 88. Plug 88 is biased by the spring 90. The plug 88 engages the upper end of the filter 72 while the lower end of the filter 72 engages the surface 68. A sleeve 94 is friction fitted into the lower end of the cap 78 and serves to maintain the alignment between the cap 78 and the casing 60 as shown in FIG. 3. That is, sleeve 94 tightly engages the cap 78 and fits freely against the interior surface of passage 62 of casing 60.

The filter element 72 is typically a porous ceramic or sintered metal material of a type well known in the art. The filter element 72 is maintained in position between the cap 78 and the surface 68 of casing 60. A collar 92 fitted about the lower end of filter element 72 catches debris which may fall into the passage 62. Thus, upon removal of filter element 72, the collar 92 is removed and may also be cleaned or replaced.

OPERATION OF THE APPARATUS

During normal opertion, the apparatus is in the first position or the configuration illustrated by FIG. 3. When the apparatus is in the FIG. 3 configuration, air enters through the swivel 38 via the strainer 96. The air then passes into the channel 36, passage 32, passage 75, through filter 72, into passage 62 and ultimately out the outlet 22. This flow is illustrated by the arrows in FIG. 2.

Again, is should be noted that the collar 92 of element 72 collects dirt and other debris which passes through the strainer 96 but not through the filter element 72. Thus, when the filter element 72 and collar 92 are removed from the filter construction 20 this debris is removed and will not pass through the outlet 22 to the interior of the fluid driven apparatus. The filter 72 is biased against the plug 88 and spring 90 when the filter construction is in the first position illustrated by FIG. 3. The filter 72 thus rides freely within the sleeve 94.

Replacement of the filter element 72 and collar 92 is accomplished by unthreading the cap 78 which coincidentally unthreads the casing member 60 due to the interaction of the keyed portions 74 and 76. The length of the engagement of the mechanical drive connection is approximately two and one half times the pitch of the coordinating screw threads. Thus, a positive drive means is established without requiring circumferentially located threads. As the cap 78 and casing 60 are rotated to the second position on the configuration as illustrated by FIGS. 4A and 4B, the casing 60 closes off the fluid flow passage through the filter construction. Importantly the longitudinal run of the threads 31 parallel to axis 29 must be at least equal to and preferably a bit greater than the travel required by the casing 60 when moving from the first to the second position in order to properly seal the air flow passage through the device by virtue of contact by casing 60 with seals 65 and 67.

The bleed hole 84 is positioned so that it is exposed to the atmosphere to relieve the residual compressed air within the fluid driven apparatus prior to removal of the cap 78 from the top of the body 26.

It is understood that the foregoing was a description of the preferred embodiment of the invention. The subject matter of the invention is to be limited only by the following claims and their equivalents.

What is claimed is:

1. An improved filter construction for a fluid flow line comprising, in combination:
   a filter body having a bore therethrough, an inlet to said bore and an outlet comprising one end of said bore, said bore also having a longitudinal axis;
   filter casing means within said bore, said casing means including a central passage connected to said outlet, an opening in said casing connectable from said passage to said inlet, and thread means for engaging said body and casing whereby said casing may be translated within said bore along the longitudinal axis to a first position for fluid flow between said inlet and outlet or a second position for sealing said inlet from said outlet;
   a filter element within the central passage of said casing means in the fluid flow path through the casing means and translatable with said casing means; and
   filter cap means for maintaining said filter element within said central passage, said filter cap means including means for removable engagement with said casing means and engagement with said body whereby said cap means and casing means are translatable cooperatively while both are within said bore along the longitudinal axis from the first position to the second position, said filter cap means being removable from engagement with said casing means and body in said second position wherein said cap means is translated axially externally of said filter body to permit access and removal of said filter element from the central passage of said casing means.

2. The improved filter construction of claim 1 wherein said inlet is transverse to the longitudinal axis of said bore and including a connecting member with said inlet, said connecting member being translatable about said filter body in a plane transverse to said longitudinal axis.

3. The improved filter construction of claim 2 wherein said filter body includes a circumferential channel about the periphery of said body coincident with said outlet, and said connecting member comprises a swivel connection member, said swivel connection member being rotatable about said body.

4. The improved filter construction of claim 1 wherein said bore is cylindrical and is threaded at its opposite ends, and wherein said casing means and said filter cap means are threaded to mate respectively with the threads at the opposite ends of said bore, said casing means and said filter cap means being keyed to each other for coincident movement upon rotation about said axis.

5. The improved filter construction of claim 1 wherein said filter cap means include means for bleeding fluid from said filter construction when in said second position.

6. The improved filter construction of claim 1 wherein said filter element is biased into position against said filter casing means by biasing means cooperable with said filter cap means.

7. The improved filter construction of claim 1 wherein said bore includes sealing means cooperative with said filter casing means, and wherein said casing means when translated from said first position to said second position sealingly engages said sealing means.

8. The improved filter construction of claim 1 including means to limit the distance of translation of said casing means.

9. The improved filter construction of claim 1 wherein the distance of translation of said cap means parallel with the axis for removing said cap means from said filter construction is no less than the distance said casing means is translated when moved from said first position to a position for sealing said fluid flow path.

10. The improved filter construction of claim 1 wherein said filter element includes means for collecting debris including a catch means which is removable from said filter construction with said filter element.

* * * * *